US012553613B2

(12) United States Patent
Tyler et al.

(10) Patent No.: US 12,553,613 B2
(45) Date of Patent: Feb. 17, 2026

(54) OVEN APPLIANCE AND EMBOSSED HEAT SHIELD FOR AN OVEN APPLIANCE

(71) Applicant: Haier US Appliance Solutions, Inc., Wilmington, DE (US)

(72) Inventors: Rebekah Leigh Tyler, Louisville, KY (US); Hans Juergen Paller, Simpsonville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 273 days.

(21) Appl. No.: 18/348,132

(22) Filed: Jul. 6, 2023

(65) Prior Publication Data

US 2025/0012452 A1    Jan. 9, 2025

(51) Int. Cl.
*F24C 3/08* (2006.01)
*F24C 3/12* (2006.01)
*F24C 15/34* (2006.01)

(52) U.S. Cl.
CPC ............. *F24C 3/087* (2013.01); *F24C 3/128* (2013.01); *F24C 15/34* (2013.01)

(58) Field of Classification Search
CPC ........... F24C 3/087; F24C 3/128; F24C 15/34

USPC ........................................................ 126/39 E
See application file for complete search history.

(56) References Cited

U.S. PATENT DOCUMENTS

| 9,404,660 B1 | 8/2016 | Karabin et al. |
| 9,562,694 B2 | 2/2017 | Paller et al. |
| 10,865,994 B2 | 12/2020 | Lee et al. |
| 2022/0154936 A1* | 5/2022 | Paller ....................... F23L 3/00 |

FOREIGN PATENT DOCUMENTS

WO    WO-2007003484 A2 *    1/2007   ............. F23D 14/10

* cited by examiner

*Primary Examiner* — Allen R. B. Schult
*Assistant Examiner* — William C Weinert
(74) *Attorney, Agent, or Firm* — Dority & Manning, P.A.

(57) ABSTRACT

An oven appliance includes a cabinet forming an oven cavity; a bottom wall provided within the oven cavity and defining a cooking chamber and a burner housing positioned below the cooking chamber along the vertical direction; a heat shield accommodated within the burner housing beneath the bottom wall along the vertical direction, the heat shield including a base panel; and a protrusion protruding upward from the heat shield along the vertical direction toward the bottom wall, the protrusion being provided behind a center point of the oven appliance along the transverse direction.

15 Claims, 5 Drawing Sheets

OVEN APPLIANCE AND EMBOSSED HEAT SHIELD FOR AN OVEN APPLIANCE

FIELD OF THE INVENTION

The present subject matter relates generally to oven appliances, and more particularly to heat shields provided within oven appliances.

BACKGROUND OF THE INVENTION

Oven appliances generally include an oven cavity for selectively accepting items to be cooked therein and one or more heating elements provided within the oven cavity. In some instances, the oven cavity is divided into a cooking chamber housing the items and a burner housing in which at least one heating element is accommodated. A bottom panel or wall may be included to differentiate the cooking chamber and the burner housing. Thus, one or more through-holes or apertures may be formed in the bottom panel through which heat or heated air may flow from the burner housing to the cooking chamber.

Many cooking appliances utilize gas heating elements or gas burners to provide heat to the cooking chamber. Such gas burners provide heat via open flames at a plurality of ports provided in the burner. However, certain drawbacks exist with current gas burner oven appliances. For instance, sudden air flow changes within the burner housing may pull flames under or over the gas burner, resulting in less than ideal cooking conditions. Additionally, the flames may become temporarily visible to users of the cooking appliance, which is undesirable.

Accordingly, an oven appliance that obviates one or more of the above-mentioned drawbacks would be beneficial. In particular, a heat shield for an oven appliance that controls flames from gas burners would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an oven appliance is provided. The oven appliance may include a cabinet forming an oven cavity; a bottom wall provided within the oven cavity and defining a cooking chamber and a burner housing positioned below the cooking chamber along the vertical direction; a heat shield accommodated within the burner housing beneath the bottom wall along the vertical direction, the heat shield including a base panel; and a protrusion protruding upward from the heat shield along the vertical direction toward the bottom wall, the protrusion being provided behind a center point of the oven appliance along the transverse direction.

In another exemplary aspect of the present disclosure, a heat shield for an oven appliance is provided. The heat shield may include a base panel defined along the lateral direction and the transverse direction; a front panel extending predominantly along the vertical direction from a front edge of the base panel; a rear panel extending predominantly along the vertical direction from a rear edge of the base panel; and a protrusion protruding upward from the base panel along the vertical direction, the protrusion being provided behind a center point of the heat shield along the transverse direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
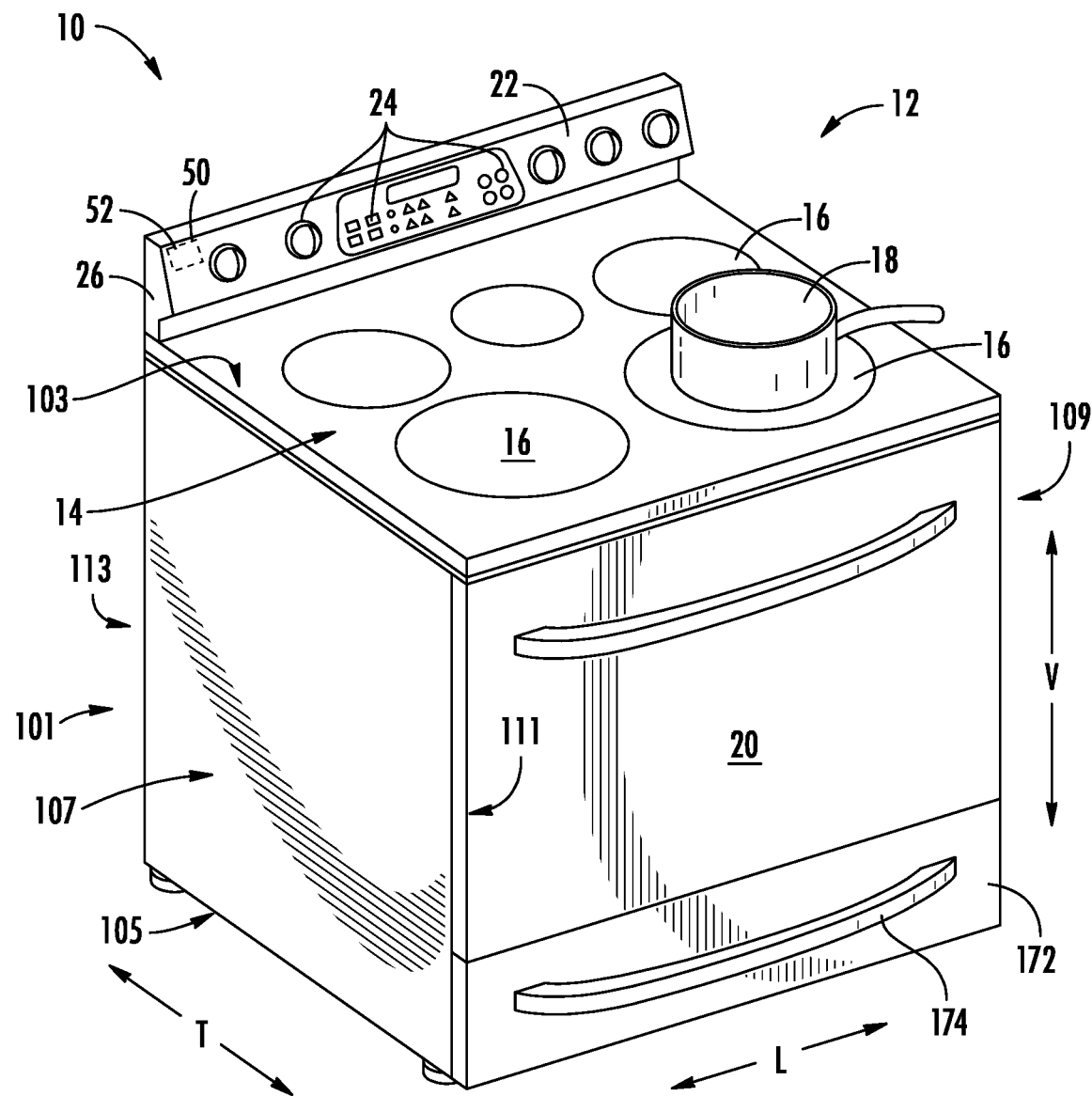
FIG. 1 provides a perspective view of an oven appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
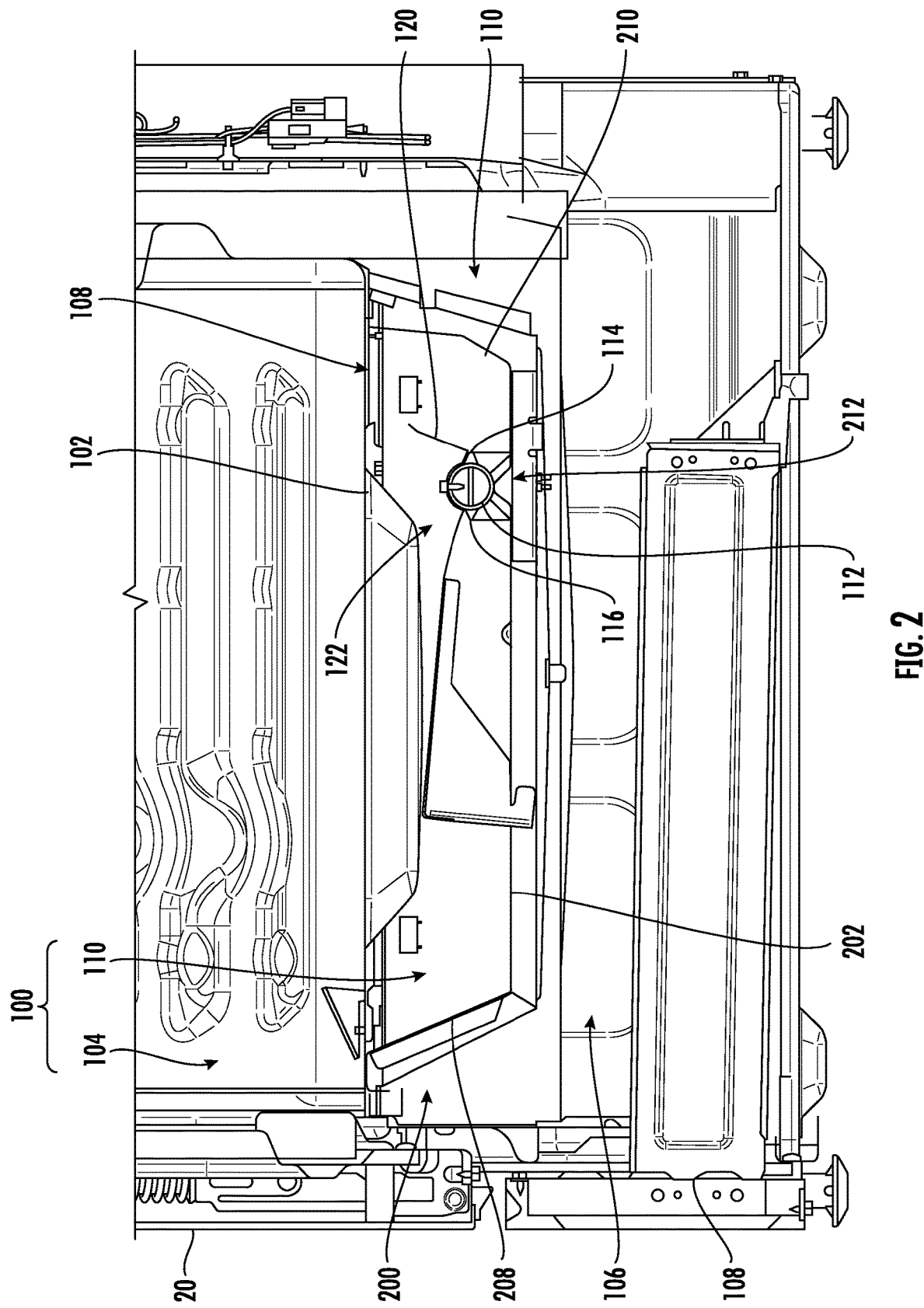
FIG. 2 provides a side cut-away view of the exemplary oven appliance of FIG. 1.

FIG. 1 provides a perspective view of a range appliance, or oven appliance 10, including a cooktop 12, and FIG. 2 provides a side cut-away view of the range appliance. Oven appliance 10 is provided by way of example only and is not intended to limit the present subject matter to the arrangement shown in FIGS. 1 and 2. Thus, the present subject matter may be used with other range 10 and/or cooktop 12 configurations, e.g., double oven range appliances. As illustrated, oven range 10 generally defines a vertical direction V, a lateral direction L, and a transverse direction T, each of which is mutually perpendicular, such that an orthogonal coordinate system is generally defined. Oven appliance 10 includes a cabinet 101 that extends between a top 103 and a bottom 105 along the vertical direction V, between a left side 107 and a right side 109 along the lateral direction, and between a front 111 and a rear 113 along the transverse direction T. Cabinet 101 may form an oven cavity 100, described in further detail below.

A cooking surface 14 of cooktop 12 includes a plurality of heating elements 16. For the embodiment depicted, the cooktop 12 includes five heating elements 16 spaced along cooking surface 14. The heating elements 16 are generally electric heating elements and are positioned at, e.g., on or proximate to, the cooking surface 14. In certain exemplary embodiments, cooktop 12 may be a radiant cooktop with resistive heating elements or coils mounted below cooking surface 14. However, in other embodiments, the cooktop appliance 12 may include any other suitable shape, configuration, and/or number of heating elements 16, for example, the cooktop 12 may be an open coil cooktop with the heating elements 16 positioned on or above surface 14. Additionally or alternatively, in other embodiments, the cooktop 12 may include any other suitable type of heating element 16, such as an induction heating element. Each of the heating elements 16 may be the same type of heating element 16, or cooktop 12 may include a combination of different types of heating elements 16.

As shown in FIG. 1, a cooking utensil 18, such as a pot, pan, or the like, may be placed on a heating element 16 to heat the cooking utensil 18 and cook or heat food items placed in cooking utensil 18. Oven appliance 10 also includes a door 20 that permits access to a cooking chamber 104 of oven appliance 10, e.g., for cooking or baking of food items therein. A control panel 22 having controls 24 permits a user to make selections for cooking of food items. Although shown on a backsplash or back panel 26 of oven appliance 10, control panel 22 may be positioned in any suitable location. Controls 24 may include buttons, knobs, and the like, as well as combinations thereof, and/or controls 24 may be implemented on a remote user interface device, such as a smartphone. As an example, a user may manipulate one or more controls 24 to select a temperature and/or a heat or power output for each heating element 16 and the cooking chamber 104. The selected temperature or heat output of heating element 16 affects the heat transferred to cooking utensil 18 placed on heating element 16.

Cooktop appliance 12 may include a control system 50 for controlling one or more of the plurality of heating elements 16 and cooking chamber 104. Specifically, control system 50 may include a controller 52 operably connected to control panel 22 and controls 24. Controller 52 may be operably connected to each of the plurality of heating elements 16 for controlling a power supply to each of the plurality of heating elements 16 in response to one or more user inputs received through control panel 22 and controls 24.

Oven appliance 10 may include a drawer recess 106, into which a drawer assembly 108 may be inserted. Drawer recess 106 may be provided underneath cooking chamber 104, for example. A user may store various items (e.g., cooking utensils 18 or the like) within drawer recess 106. Additionally or alternatively, drawer recess 106 may be used as a temporary storage area for food (e.g., as a warming zone or area). According to some embodiments, drawer recess 106 may be an additional cooking or baking zone, in which food items may be cooked or baked. It should be noted that drawer recess 106 may be used for any suitable purposes, and the disclosure is not limited to those examples given herein. An opening to drawer recess 106 may be defined in the lateral direction L and vertical direction V. In detail, drawer recess 106 may be configured such that drawer assembly 108 is withdrawn in the transverse direction T from drawer recess 106.

Referring generally to FIGS. 2 through 5, oven appliance 10 may define an oven cavity 100. Oven cavity 100 may be defined at least in part by a bottom wall 102. Bottom wall 102 may divide oven cavity 100 into a cooking chamber 104 and a burner housing 110. In some embodiments, burner housing 110 is provided below cooking chamber 104 (e.g., under the bottom wall 102). Bottom wall 102 may include an outlet port 108 defined therein. In some embodiments, outlet port 108 is provided at a rear of bottom wall 102 (e.g., proximate a rear of oven appliance 10 opposite door 20). Outlet port 108 may allow fluid communication between cooking chamber 104 and burner housing 110 through bottom wall 102. For example, air heated in burner housing 110 may pass into cooking chamber 104 via outlet port 108.

Although a single outlet port 108 is illustrated and described herein, it should be appreciated that any suitable, number, size, position, and configuration of outlet ports could be used while remaining within the scope of the present subject matter. For example, in some embodiments, multiple outlet ports 108 may be defined in the bottom wall 102. In these embodiments, the outlet ports 108 may be spaced apart from each other in the lateral direction L.

Oven appliance 10 may include a burner 112. Burner 112 may be provided beneath the bottom wall 102 (e.g., within the burner housing 110). The burner 112 may be a gas burner (e.g., a burner using a gas fuel to create a flame to produce heat). Burner 112 may have any suitable shape, for example, cylindrical, pancake (e.g., flat), square, etc. Burner 112 may be oriented such that a longitudinal axis of the burner 112 extends in the lateral direction L. As such, burner 112 may define a first end proximate a first lateral side of the oven cavity and a second end opposite the first end and proximate a second lateral side of the oven cavity. Further, burner 112 may be provided in plurality under the bottom wall 102. For example, two burners 112 may be provided and spaced apart from each other in the lateral direction L. For another example, two burners 112 may be provided and spaced apart from each other in the transverse direction T (e.g., a first burner at a rear of the oven cavity 100 and a second burner at a front of the oven cavity).

Burner 112 may include a plurality of first gas ports 114. The plurality of first gas ports 114 may be defined in an outer surface of the burner 112. In one example, when burner 112 is a cylindrical burner, the first gas ports 114 are defined in the circumferential surface of the burner 112. In another example, when burner 112 is a pancake burner, the first gas ports 114 are defined in a side panel of burner 112. According to an exemplary embodiment, first gas ports may face toward outlet port 108 or may otherwise direct a flame and/or heated gas toward outlet port 108. For example, first gas ports 114 may face substantially toward the rear of the oven cavity 100, e.g., such that outlet port 108 is positioned between burner 112 and a rear wall of cooking chamber 104 along the transverse direction T.

Burner 112 may further include a plurality of second gas ports 116. The plurality of second gas ports 116 may be defined in an outer surface of burner 112. In one example, when burner 112 is a cylindrical burner, second gas ports 116 are defined in the circumferential surface of burner 112. In another example, when burner 112 is a pancake burner, second gas ports 116 are defined in a side panel of burner 112. The second gas ports 116 may face substantially toward the front of oven cavity 100 (e.g., toward the door 20) and away from outlet port 108. The plurality of second gas ports 116 may be fewer in number than the plurality of first gas ports 114 (e.g., there may be a fewer total number of second gas ports 116 than first gas ports 114). Additionally or alternatively, a size of each of the plurality of second gas ports 116 may be smaller than a size of each of the plurality of first gas ports 114. The size of each of the first gas ports 114 and second gas ports 116 may be measured by gas port area (e.g., a cross-sectional area of the gas port). However, according to some embodiments, the size of each of the plurality of first gas ports 114 may be equal to the size of each of the plurality of second gas ports 116.

Oven appliance 10 may further include a burner shield 120. Burner shield 120 and burner 112 may collectively be referred to as a burner assembly 122. Burner shield 120 may be provided beneath the bottom wall 102 (e.g., within the burner housing 110). Burner shield 120 may be provided above burner 112. For example, burner shield 120 is located between burner 112 and bottom wall 102. Burner shield 120 may have a length in the lateral direction L and a width in the transverse direction T. The length of burner shield 120 may be commensurate with a length of outlet port 108 in the lateral direction. The width of burner shield 120 may be greater than a width of burner 112 in the transverse direction T (e.g., a diameter of burner 112).

Oven appliance 10 may include a heat shield 200. Heat shield 200 may be provided below bottom wall 102. For instance, heat shield may form a lower boundary of burner housing 110. Accordingly, burner housing 110 may be formed collectively by heat shield 200, bottom wall 102, and one or more side panels. Burner 112 may be selectively coupled to burner housing 110. According to some examples, a distal end of burner 112 is fixed to a bottom pane or panel of burner housing 110 via one or more fasteners. Heat shield 200 may thus provide heat resistance to drawer recess 106. For instance, heat produced at burner 112 may be restricted from heating items provided within drawer recess 106 (or drawer assembly 108). Additionally or alternatively, heat shield 200 may be a plate provided underneath burner 112 within burner housing 110. For instance, heat shield 200 may, in some instances, include one or more additional plates coupled thereto or provided adjacent thereto.

Figure 3:
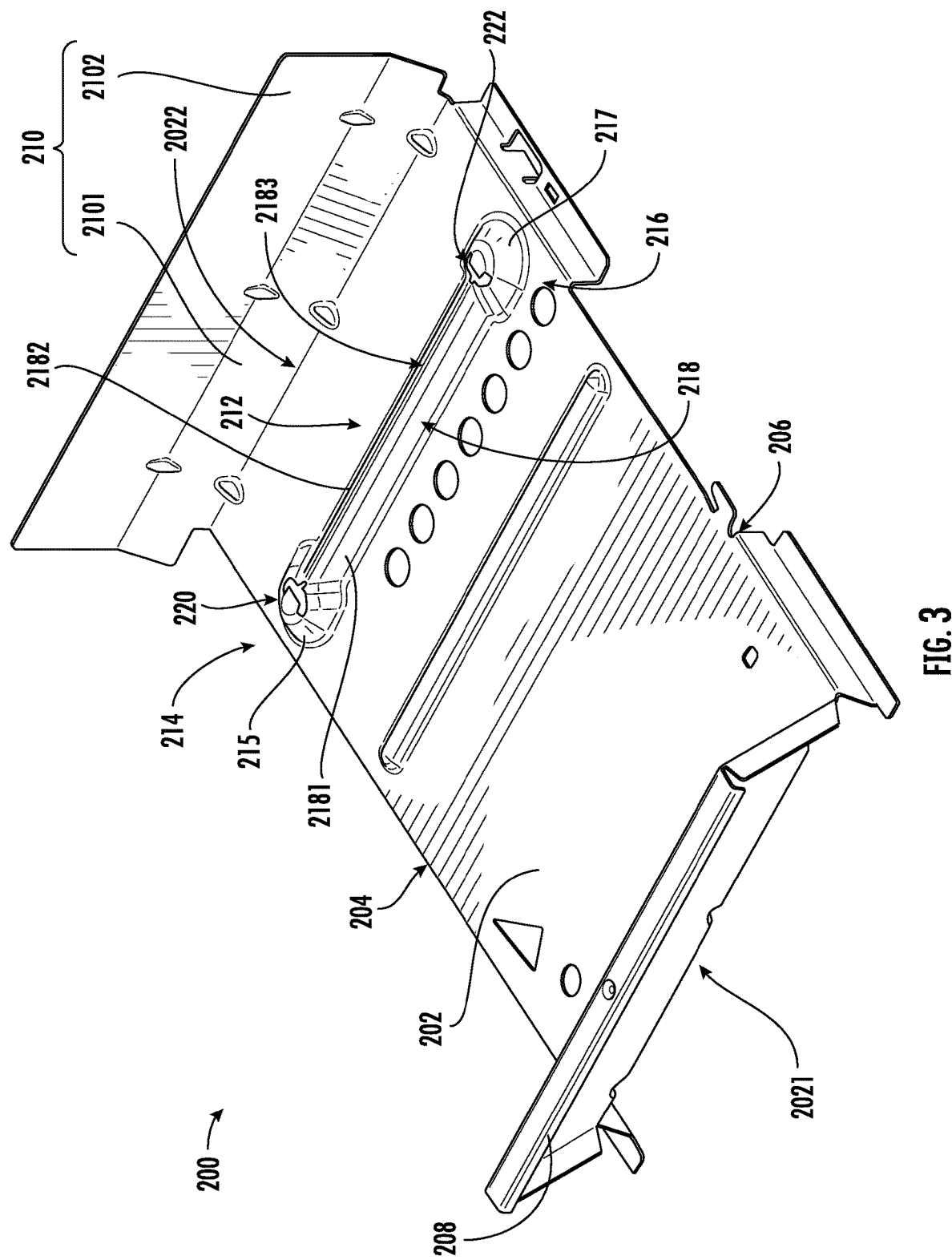
FIG. 3 provides a perspective view of an exemplary heat shield of the exemplary oven appliance of FIG. 1.
Figure 4:
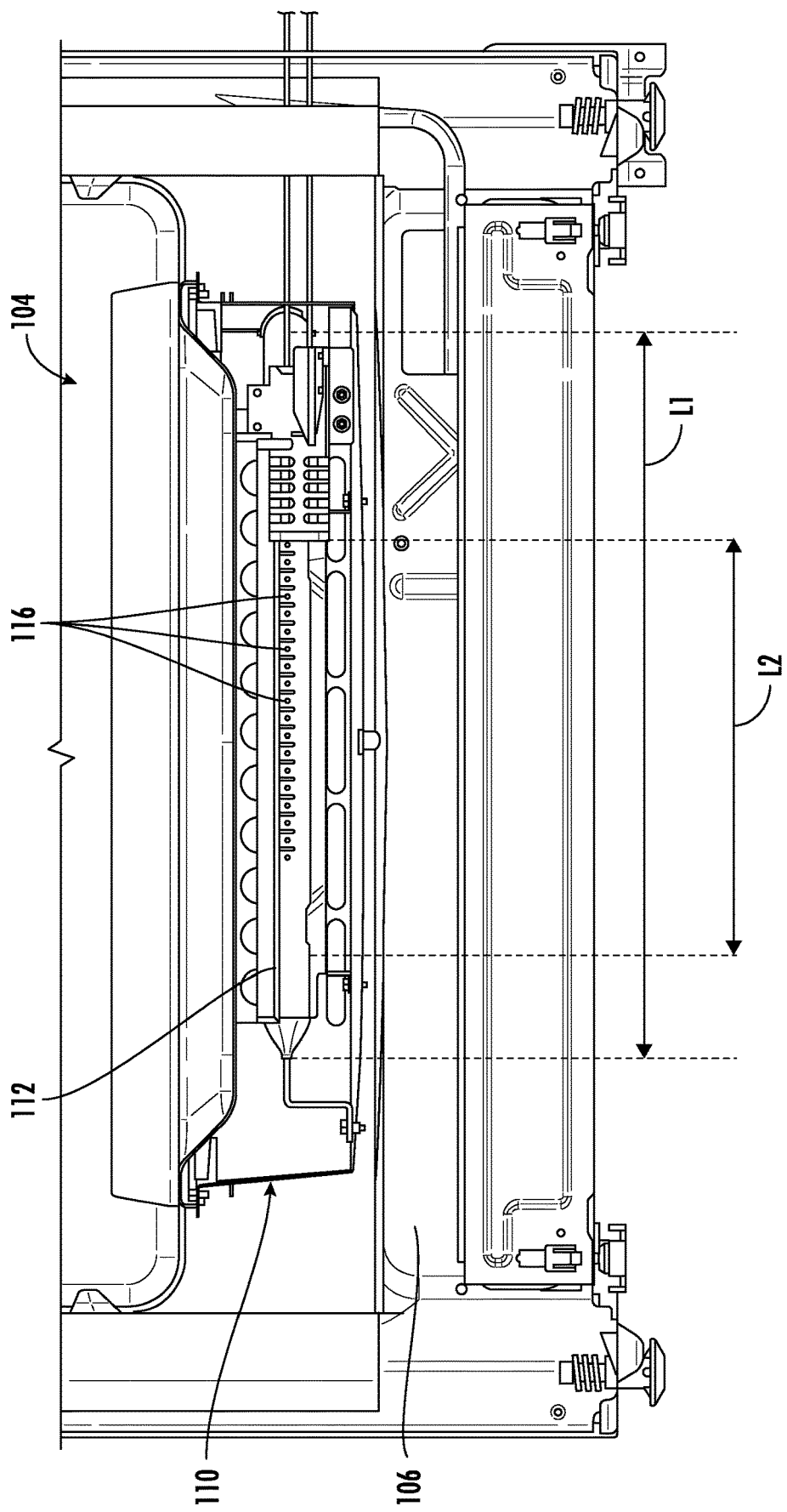
FIG. 4 provides a front view of the exemplary oven appliance of FIG. 1 with a door removed.

Referring briefly to FIG. 3, heat shield 200 may include a base panel 202. Base panel 202 may be defined primarily along the lateral direction L and the transverse direction T. For instance, base panel 202 may include a first lateral edge 204 and a second lateral edge 206 opposite the first lateral edge 204 (e.g., along the lateral direction L). Additionally or alternatively, heat shield 200 may include a front panel 208 extending from a front edge 2021 of base panel 202. Front panel 208 may extend predominantly along the vertical direction V (e.g., from the front edge 2021 of base panel 202). For instance, front panel 208 may extend at a predetermined angle with respect to base panel 202 (e.g., along each of the vertical direction V and the transverse direction T). The predetermined angle may, according to some embodiments, be between about 95 degrees and about 115 degrees with respect to base panel 202 (FIG. 2). Accordingly, front panel 208 may extend generally toward front 111 of oven appliance 10.

Heat shield 200 may include a rear panel 210 extending from a rear edge 2022 of base panel 202. Rear panel 210 may extend predominantly along the vertical direction V (e.g., from the rear edge 2022 of base panel 202). For instance, rear panel 210 may extend at a predetermined angle with respect to base panel 202 (e.g., along each of the vertical direction V and the transverse direction T). The predetermined angle may, according to some embodiments, be between about 95 degrees and about 115 degrees with respect to base panel 202 (FIG. 2). Accordingly, rear panel 210 may extend generally toward rear 113 of oven appliance 10. Additionally or alternatively, rear panel 210 may include a first portion 2101 and a second portion 2102. First portion 2101 may extend from the rear of base panel 202 at a first angle (e.g., between about 100 degrees and about 110 degrees). First portion may extend a first predetermined distance (e.g., between about 40% and about 50% of a total length of rear panel 2101. Second portion 2102 may extend from a distal edge of first portion 2101 at a second angle (e.g., between about 90 degrees and about 100 degrees with respect to base panel 202). Accordingly, second portion 2102 may be more vertically inclined than first portion 2101. Moreover, a distal end of second portion 2102 may be provided adjacent with opening 108. For instance, the distal end of second portion 2102 may guide heat from burner 112 into cooking chamber 104.

Heat shield 200 may include a protrusion 212. Protrusion 212 may protrude upward (e.g., along the vertical direction V) from base panel 202. In detail, protrusion may be an emboss formed directly into base panel 202 (e.g., via stamping, bending, forming, punching, or the like). Accordingly, heat shield 200 and protrusion 212 may be a single unitary piece (e.g., such that protrusion is not a separate piece attached to base panel 202). However, in some embodiments, protrusion 212 may be fixed, assembled to, or otherwise connected to base panel 202. Protrusion 212 may extend along the lateral direction L. For instance, protrusion 212 may be elongated along the lateral direction L such that a first end 214 of protrusion 212 is proximate first lateral edge 204 of base panel 202 and a second end 216 of protrusion 212 is proximate second lateral edge 206 of base panel 202. A total length (e.g., along the lateral direction L) of protrusion 212 may be between about 85% and about 95% of a total length (e.g., along the lateral direction L) of base panel 202. Accordingly, protrusion 212 may extend predominantly an entire lateral width of heat shield 200. Additionally or alternatively, protrusion 212 may protrude directly from a base of burner housing 110 (e.g., separately from heat shield 200).

Protrusion 212 may include first end 214, second end 216, and a body 218 extending between first end 214 and second end 216. First end 214 may define a first footprint. For instance, first end 214 may include a rounded base conically tapered upward along the vertical direction V. As shown in FIG. 3, each of first end 214 and second end 216 may generally form a "D" shape footprint on base panel 202. Sidewalls 215 of first end 214 and sidewalls 217 of second end 216 may taper upward along the vertical direction V to a first contact point 220 and a second contact point 222, respectively.

Body 218 of protrusion 212 may connect first end 214 with second end 216. In detail, body 218 may be elongated along the lateral direction L. Body 212 may include a front surface 2181. Front surface 2181 may extend at a first predetermined angle with respect to base panel 202 (e.g., along the vertical direction V and the transverse direction T). For instance, front surface 2181 may extend rearward (e.g., along the transverse direction T) and upward (e.g., along the vertical direction V) from base plate 202 to an apex 2183 of body 218. Front surface 2181 may be predominantly planar. However, according to some embodiments, front surface 2181 may be curved. For instance, front surface 2181 may be curved convexly or concavely (e.g., along the vertical direction V and the transverse direction T).

Body 212 may include a rear surface 2182. Rear surface 2182 may extend at a second predetermined angle with respect to base panel 202 (e.g., along the vertical direction V and the transverse direction T). For instance, rear surface 2182 may extend forward (e.g., along the transverse direction T) and upward (e.g., along the vertical direction V) from base plate 202 to apex 2183 of body 218. Rear surface 2182 may be predominantly planar. However, according to some embodiments, rear surface 2182 may be curved. For instance, rear surface 2182 may be curved convexly or concavely (e.g., along the vertical direction V and the transverse direction T).

Figure 5:
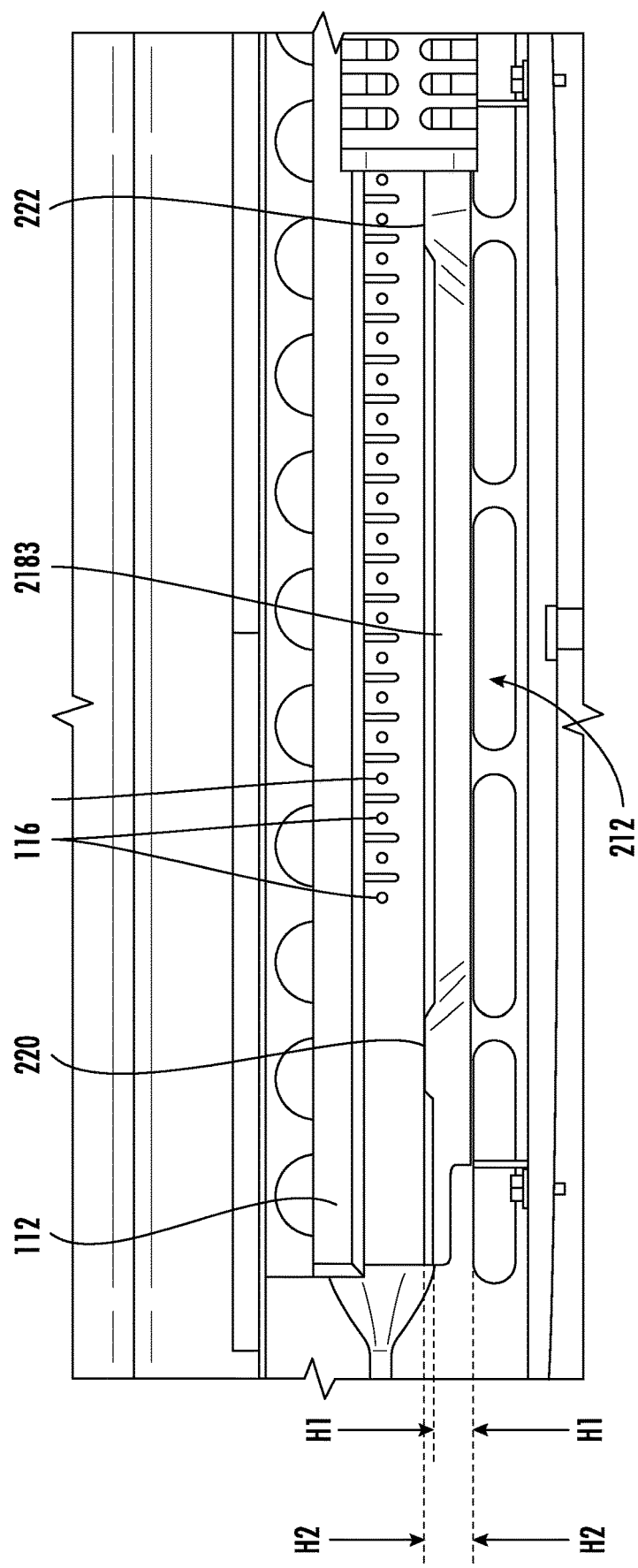
FIG. 5 provides a close-up front view of a protrusion from the exemplary heat shield of FIG. 3.

Referring briefly to FIG. 5, a height H1 of body 218 may be less than a height H2 of each of first contact point 220 and second contact point 222. For instance, height H1 may be defined between base panel 202 (e.g., a top surface thereof) and apex 2183 of body 218. Height H2 may be defined between base panel 202 (e.g., the top surface thereof) and each of first contact point 220 and second contact point 222. Thus, first contact point 220 and second contact point 222 may be equal in height (e.g., second height H2). Accordingly, first end 214 and second end 216 may protrude a greater distance from base panel 202 than body 218.

Protrusion 212 may be positioned underneath burner 112. In detail, referring briefly to FIG. 2, burner 112 may be positioned directly above protrusion 212 along the vertical direction V. Additionally or alternatively, protrusion 212 may extend parallel with burner 112 (e.g., along the lateral direction L). In some embodiments, a length of protrusion 212 along the lateral direction L is less than a length of burner 112 along the lateral direction L. For instance, burner 112 may have a first length L1 along the lateral direction L while protrusion 212 has a second length L2 along the lateral direction L. L1 may be greater than L2 by about 20% to about 30%. Protrusion 212 may thus be provided behind a center point of oven appliance 10 along the transverse direction T (e.g., proximate rear 113 of oven appliance 10).

First contact point 220 may selectively contact burner 112 at a first location. For instance, a bottom or under portion of burner 112 may contact first contact point 220 along the vertical direction V. Additionally or alternatively, second contact point 222 may selectively contact burner 112 (e.g., at a second location). Accordingly, a gap may be formed between body 218 (e.g., apex 2183) of protrusion 212 and burner 112. Advantageously, air may not be restricted from flowing between burner 112 and protrusion 212. However, protrusion 212 may assist in reducing large airflow gusts around burner 112 (e.g., during an opening and/or closing of door 20).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical direction, a lateral direction, and a transverse direction, the oven appliance comprising:
    a cabinet forming an oven cavity;
    a bottom wall provided within the oven cavity and defining a cooking chamber and a burner housing positioned below the cooking chamber along the vertical direction;
    a heat shield accommodated within the burner housing beneath the bottom wall along the vertical direction, the heat shield comprising a base panel; and
    a protrusion protruding upward from the heat shield along the vertical direction toward the bottom wall, the protrusion being provided behind a center point of the oven appliance along the transverse direction, the protrusion extending along the lateral direction from a first end to a second end, the first end being positioned proximate a first lateral edge of the heat shield and the second end being positioned proximate a second lateral edge of the heat shield opposite the first lateral edge along the lateral direction, the protrusion comprising:
        a body extending between the first end and the second end along the lateral direction, the body comprising:
            a front surface, the front surface extending at a first predetermined angle with respect to the base panel along the vertical direction and the transverse direction; and
            a second surface, the second surface extending at a second predetermined angle with respect to the base panel along the vertical direction and the transverse direction.

2. The oven appliance of claim 1, further comprising:
a burner provided within the burner housing, wherein the burner is positioned directly above the protrusion along the vertical direction.

3. The oven appliance of claim 2, wherein the burner is a gas heating element comprising a first set of gas ports facing forward along the transverse direction and a second set of gas ports facing rearward along the transverse direction opposite the first set of gas ports.

4. The oven appliance of claim 2, wherein the protrusion comprises:
a first contact point provided at the first end, the first contact point being in contact with the burner; and
a second contact point provided at the second end, the second contact point being in contact with the burner.

5. The oven appliance of claim 4, wherein a height from the base panel to each of the first contact point and the second contact point is greater than a height from the base panel to an apex of the body.

6. The oven appliance of claim 2, wherein a length of the protrusion along the lateral direction is less than a length of the burner along the lateral direction.

7. The oven appliance of claim 1, wherein the protrusion is formed as a stamped emboss within the heat shield such that the protrusion and the heat shield are a single unitary piece.

8. A heat shield for an oven appliance, the heat shield defining a vertical direction, a lateral direction, and a transverse direction, the heat shield comprising:
a base panel defined along the lateral direction and the transverse direction;
a front panel extending predominantly along the vertical direction from a front edge of the base panel;
a rear panel extending predominantly along the vertical direction from a rear edge of the base panel; and
a protrusion protruding upward from the base panel along the vertical direction, the protrusion being provided behind a center point of the heat shield along the transverse direction, the protrusion extending along the lateral direction from a first end to a second end, the first end being positioned proximate a first lateral edge of the heat shield and the second end being positioned proximate a second lateral edge of the heat shield opposite the first lateral edge along the lateral direction, the protrusion comprising:
a body extending between the first end and the second end along the lateral direction, the body comprising:
a front surface, the front surface extending at a first predetermined angle with respect to the base panel along the vertical direction and the transverse direction; and
a second surface, the second surface extending at a second predetermined angle with respect to the base panel along the vertical direction and the transverse direction.

9. The heat shield of claim 8, further comprising:
a burner attached to the oven appliance, wherein the burner is positioned directly above the protrusion along the vertical direction.

10. The heat shield of claim 9, wherein the burner is a gas heating element comprising a first set of gas ports facing forward along the transverse direction and a second set of gas ports facing rearward along the transverse direction opposite the first set of gas ports.

11. The heat shield of claim 9, wherein the protrusion comprises:
a first contact point provided at the first end, the first contact point being in contact with the burner; and
a second contact point provided at the second end, the second contact point being in contact with the burner.

12. The heat shield of claim 11, wherein a height from the base panel to each of the first contact point and the second contact point is greater than a height from the base panel to an apex of the body.

13. The heat shield of claim 9, wherein a length of the protrusion along the lateral direction is less than a length of the burner along the lateral direction.

14. The heat shield of claim 8, wherein the protrusion is formed as a stamped emboss within the heat shield such that the protrusion and the heat shield are a single unitary piece.

15. An oven appliance defining a vertical direction, a lateral direction, and a transverse direction, the oven appliance comprising:
a cabinet forming an oven cavity;
a bottom wall provided within the oven cavity, wherein the bottom wall divides the oven cavity into a cooking chamber and a burner housing positioned below the cooking chamber along the vertical direction;
a protrusion protruding upward from a bottom of the burner housing along the vertical direction toward the bottom wall, the protrusion being provided behind a center point of the oven appliance along the transverse direction, the protrusion extending along the lateral direction from a first end to a second end, the protrusion comprising:
a body extending between the first end and the second end along the lateral direction, the body comprising:
a front surface, the front surface extending at a first predetermined angle with respect to the bottom of the burner housing along the vertical direction and the transverse direction; and
a second surface, the second surface extending at a second predetermined angle with respect to the bottom of the burner housing along the vertical direction and the transverse direction; and
a burner provided within the burner housing, the burner being positioned above the protrusion along the vertical direction, wherein the burner contacts the protrusion at a first lateral end and a second lateral end thereof.

* * * * *